Patented Sept. 28, 1948

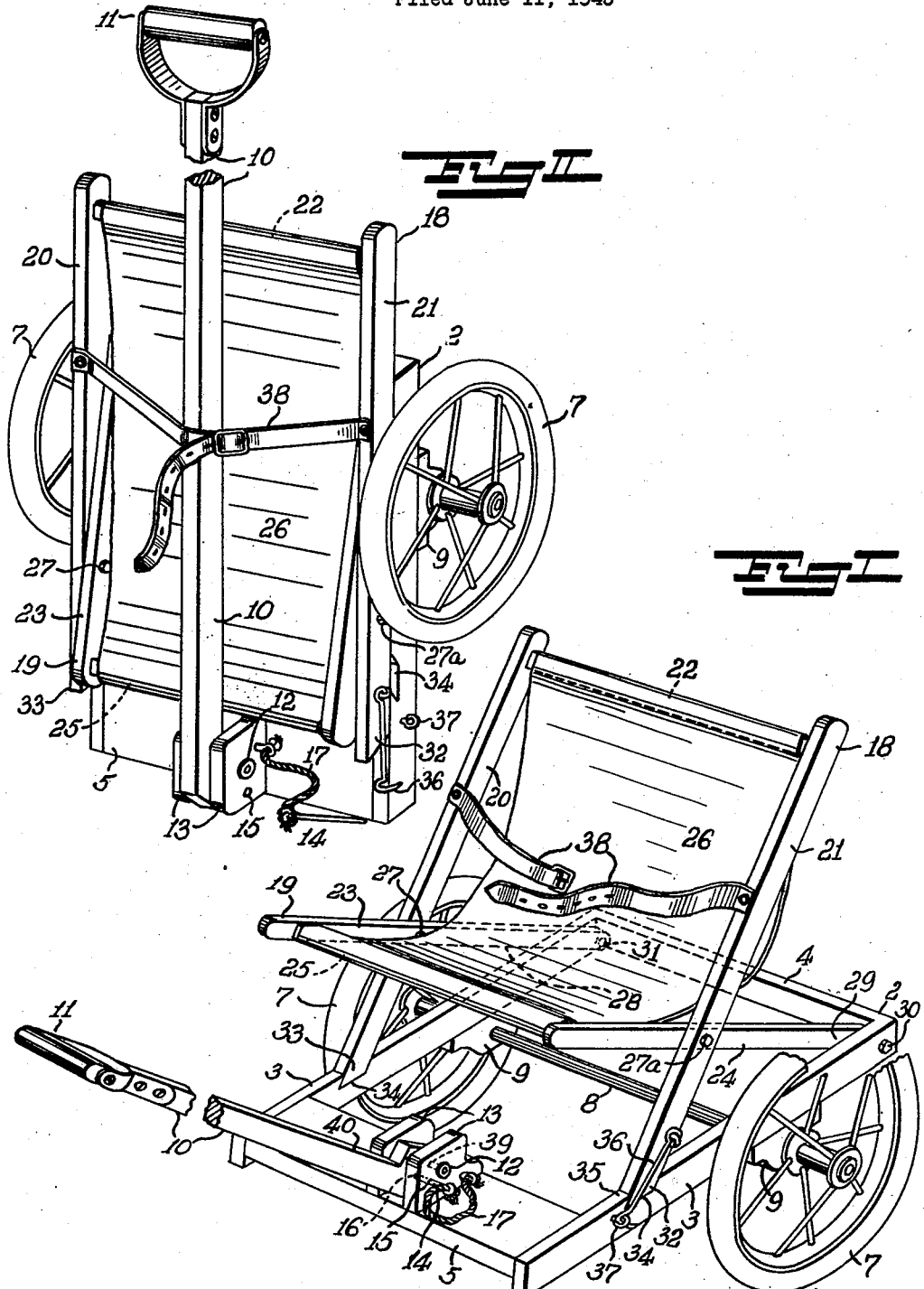

2,450,373

UNITED STATES PATENT OFFICE 2,450,373

FOLDING GOCART

Heinrich Albert Fiene, Johannesburg, Transvaal, Union of South Africa

Application June 11, 1945, Serial No. 598,783
In the Union of South Africa June 19, 1944

8 Claims. (Cl. 280—36)

This invention relates to go-carts of the kind comprising two wheels, a cart frame, means for seating a child and a handle by means of which the cart is propelled and balanced on the wheel axle; and such that the structure can be collapsed to small bulk for carrying and stowing it, and opened out into a rigid structure for use as a cart.

The object of the invention is to improve the design which permits the collapsing and unfolding.

According to the invention the seating means is a chair of the folding deck chair pattern, that is comprising two chair frames each comprising two side members and an upper cross bar. The two chair frames are pivoted together between their ends on an axis transverse to the sides, and so that they may be collapsed to occupy materially a single plane or to be opened out to exhibit an X-shaped side elevation. The seat member of the chair is a length of flexible material such as canvas suspended at its ends respectively from the upper cross bars of the frames.

The foot of one of the frames is pivotally attached horizontally to the cart frame; which latter is horizontal when the cart is in use and to which the wheels and the handle are attached. The foot of the other frame is free to move to allow the chair frames to rotate about the two pivotal axes, and means are provided whereby said foot can be secured to the cart frame at such a distance in front of the pivoted frame foot, that the chair is then in its erected X position, for use as the seating means.

The occupant of the cart preferably faces towards the handle; and the handle end of the cart frame provides a step or foot rest.

The handle may be a rod with a cross handle grip at its outer end. It is hinged to said foot rest in order to fold down parallel with the cart frame and the folded down chair; and an important feature of the invention is that when the handle is so folded down it constitutes a keeper for holding the chair in its folded down position against the cart frame. Means, attached to one of the other parts of the cart, are provided to retain the handle in its folded down position. According to a further feature, this function is performed by a pair of straps which also serve the purpose of strapping the child in the chair.

An example of the invention is illustrated in the accompanying drawings in which Figure I shows the cart expanded for use.

Figure II shows the cart folded and in its carried position.

The cart comprises the cart frame 2, consisting of the two side bars 3, 3, the back cross bar 4, and the front cross bar 5 which is made wide enough to act as a step and foot rest. The cart further comprises the two wheels 7 mounted on an axle 8 which in turn is secured to the underside of the frame 2 by any suitable means such as the blocks 9.

The handle comprises the rod 10 with the cross grip 11 at one end. At its other end the rod 10 is pivoted on a horizontal pivot pin 12 extending between the pair of rigid cheeks 13 secured to the step 5. The handle is thus capable of swinging in a plane perpendicular to the frame 2 and the axle 8, between its position of use shown in Figure I in which it extends upwardly and forwardly from the frame 2, to its collapsed position of Figure II. In the former position it is held rigid with the frame by its close fit between the cheeks 13 and by the pin 14 which is passed through holes 15 in the cheeks and the hole 16 in the rod 10 that come into register when the handle is extended, said holes being spaced radially from the pivot pin 12. The pin 14 is secured to the cart by a flexible attachment 17.

The chair comprises the chair frames 18 and 19 respectively. The chair frame 18 consists of the two parallel side members 20, 21 and the cross member 22 at one end. The chair frame 19 similarly consists of the two parallel side members 23, 24 and the cross member 25 at one end. A canvas sheet 26 is attached at its end to the respective cross members 22 and 25, and hangs hammockwise for the child to sit in.

The chair frames are pivoted to one another by the rivet 27 passed through the chair frame members 20, 23 and the rivet 27a passed through the chair frame members 21, 24. Said rivets are alined on a common cross axis, on which the frames 18, 19 can rotate relatively to one another to assume X side elevation familiar in deck chairs and shown in Figure I; and alternatively to assume the collapsed position shown in Figure II in which the chair frames are substantially parallel with one another.

The feet 28, 29 of the chair frame 18 are attached to the cart frame 2 and near to the rear end of the latter, by the horizontal pivot pins 30, 31, so securing the chair as a whole to the cart frame while permitting it to move towards or away from the cart frame.

In order to secure the front feet 32, 33 of the chair to the cart frame 2 when the chair is erected, there are formed in the upper surfaces of the side members 3 of the cart frame the notches 34 into which said feet fit closely when the chair is erected. The notches provide the overhanging lips 35 that fit over the V-shaped ends of the chair feet 32, 33 and so hold the latter down unless the latter is pulled straight out of the notch; which is a movement not likely to occur in the ordinary use of the cart. The connection may however be made positive by means of the latch and eye 36, 37.

To collapse the cart, the latch 36 is released, the feet 32 are withdrawn from the notches 34, the chair frames are folded together, and the folded chair is swung about the pivots 30, 31 to lie substantially flat on the cart frame 2. The canvas 26 is made long enough to allow the chair frames thus to lie materially parallel with one another.

The retaining pin 14 of the handle is withdrawn, and the handle is swung back about is pivot 12 to lie over the folded down chair frames; and so that it presses on the cross bar 25. In so doing, the handle acts as a force-multiplying lever that exerts considerable pressure on the bar 25 and thereby so locks the chair frames that they cannot swing about their pivots 27, nor can the chair as a whole swing about the pivots 30, 31.

The handle is held down in this position by the straps 38 attached to the side members of the chair frame 18; which straps are also available for strapping the child in the chair during use of the cart.

The pivot end of the handle rod 10 is enlarged at one side to enable the pin hole 39 of the handle to be offset to one side of the surface 40 of the handle that makes contact with the cross bar 25. This enables the handle to fold to a position about parallel with the cart frame 2, without the cheeks 13 having to be made of inconvenient height above the foot rest 5.

The collapse of the cart to the Figure II form, brings the cross handle 10 into a convenient position for carrying the cart by hand.

I claim:

1. A folding go cart comprising a cart frame, a pair of wheels attached to the cart-frame, means for seating a child, and a handle for propelling and steering the cart, the seating means being a chair of the folding deck chair pattern formed of two chair frames each comprising two side members and an upper cross-bar, the chair frames being pivoted together between their ends on an axis transverse to the sides, and so that they may be collapsed to occupy materially a single plane and may be extended to exhibit an X-shaped side elevation and said chair also including a seat member of flexible material extending between the upper cross bars of the chair frames, the foot of one of the chair frames being pivotally attached to the cart frame on a horizontal axis, the foot of the second chair frame being free to move relatively to the cart frame to allow the seat frames to collapse from their X position to a position where both are materially in one plane with the cart frame, the length of the flexible seat member being such as to permit such collapse directly from the X position by direct separation of the upper frame cross bars between which the flexible seat extends, and means for securing said foot of the second chair frame detachably to the cart frame and thereby hold the chair rigidly in its extended position.

2. The cart claimed in claim 1, in which the means for attaching the foot of the second chair frame consists of formations on the cart frame which so engage said foot that disengagement of the latter is resisted by the weight of the chair and by any weight that may rest on the chair; said formations consisting of notches in the upper surface of the cart frame with sloping lips that overhang pointed ends of said foot of said second chair frame when the latter is extended to exhibit an X-shaped side elevation.

3. A folding go cart comprising a cart-frame, a pair of wheels attached to the cart-frame, means for seating a child, and a handle for propelling and steering the cart, the seating means being a chair of the folding deck chair pattern formed of two chair frames each comprising two side members and an upper cross-bar, the chair frames being pivoted together between their ends on an axis transverse to the sides, and so that they may be collapsed to occupy materially a single plane and may be extended to exhibit an X-shaped side elevation and said chair also including a seat member of flexible material extending between the upper cross bars of the chair frames, the foot of one of the chair frames being pivotally attached to the cart frame on a horizontal axis, the foot of the second chair frame being free to move to allow the seat frames to extend and collapse, and means for securing said foot of the second chair frame detachably to the cart frame and thereby holding the chair rigidly in its extended position; said handle being pivoted to said frame as to be capable of assuming one attitude in which it is projected obliquely upward for use as the cart handle and another attitude in which it lies materially parallel with the cart frame and holds the collapsed chair against said frame; said cart also comprising means to secure said handle, in its projected attitude, rigidly to said frame and further means for retaining it in its other attitude in which it lies materially parallel with said frame.

4. The cart claimed in claim 3, in which both chair frames can be collapsed to be materially in one plane with the cart frame.

5. A folding go cart comprising a cart frame, a pair of wheels attached to the cart-frame, means for seating a child, and a handle for propelling and steering the cart, the seating means being a chair of the folding deck chair pattern formed of two chair frames each comprising two side members and an upper cross-bar, the chair frames being pivoted together between their ends on an axis transverse to the sides, and so that they may be collapsed to occupy materially a single plane and may be extended to exhibit an X-shaped side elevation and said chair also including a seat member of flexible material extending between the upper cross bars of the chair frames, the foot of one of the chair frames being pivotally attached to the cart frame on a horizontal axis, the foot of the second chair frame being free to move to allow the seat frames to extend and collapse, and means for securing said foot of the second chair frame detachably to the cart frame and thereby holding the chair rigidly in its extended position, said handle being so pivoted to the cart frame on a horizontal axis as to be capable of assuming one attitude in which it is projected obliquely upward for use as the cart handle and another attitude in which it lies materially parallel with the cart frame; said cart comprising means to secure the handle rigid with the cart frame in said projected attitude; said handle being mounted to fold back over the collapsed chair and so as to contact, when thus folded back, a chair frame cross bar and act as a keeper to retain the chair collapsed flat with the cart frame.

6. A cart as claimed in claim 5, and comprising means for retaining said handle in its folded back position in which it lies materially parallel with said frame.

7. A cart as claimed in claim 5 and comprising means for retaining said handle in its folded back position in which it lies materially parallel with said frame; said means including straps that are available to hold the child in the chair.

8. A folding go cart comprising a cart frame, a pair of wheels attached to the cart frame, means for seating a child, and a handle for propelling and steering the cart, the seating means being a chair of the folding deck chair pattern formed of two chair frames each comprising two side members and an upper cross bar, the chair frames being pivoted together between their ends on an axis transverse to the sides, and so that they may be collapsed to occupy materially a single plane and may be extended to exhibit an X-shaped side elevation and said chair also including a seat member of flexible material extending between the upper cross bars of the chair frames, the foot of one of the chair frames being pivotally attached to the cart frame on a horizontal axis, the foot of the second chair frame being free to move relatively to the cart frame to allow the seat frames to collapse from their X position to a position where both are materially in one plane with the cart frame, the length of the flexible seat member being such as to permit such collapse directly from the X position by direct separation of the upper frame cross bars between which the flexible seat extends, means for securing said foot of the second chair frame detachably to the cart frame and thereby hold the chair rigidly in its extended position, said handle being so pivoted to the cart frame on a horizontal axis as to be capable of assuming one attitude in which it is projected obliquely upward for use as the cart handle and another attitude in which it lies materially parallel with the cart frame, and means to secure the handle rigid with the cart frame in the projected attitude.

HEINRICH ALBERT FIENE.

REFERENCES CITED

The following references are of record in the file of this patent:

UNITED STATES PATENTS

| Number | Name | Date |
| --- | --- | --- |
| 27,189 | Lamb | Feb. 14, 1860 |
| 1,341,225 | Clough | May 25, 1920 |

FOREIGN PATENTS

| Number | Country | Date |
| --- | --- | --- |
| 31,505 | Denmark | Mar. 21, 1923 |